US007240995B2

(12) United States Patent
Adkins et al.

(10) Patent No.: US 7,240,995 B2
(45) Date of Patent: Jul. 10, 2007

(54) METHOD OF AUTHENTICATING A CONSUMABLE

(75) Inventors: Christopher A. Adkins, Lexington, KY (US); Michael C. Campbell, Lexington, KY (US); Donald F. Croley, Georgetown, KY (US); Timothy L. Strunk, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 324 days.

(21) Appl. No.: 10/431,485

(22) Filed: May 6, 2003

(65) Prior Publication Data

US 2004/0223011 A1 Nov. 11, 2004

(51) Int. Cl.
*B41J 2/045* (2006.01)

(52) U.S. Cl. .............................. 347/68; 347/69; 347/19

(58) Field of Classification Search .................. 347/19, 347/68; 713/176, 168, 175; 380/205
See application file for complete search history.

(56) References Cited

U.S. PATENT DOCUMENTS

| 4,799,061 | A | 1/1989 | Abraham et al. ......... 340/5.26 |
|---|---|---|---|
| 4,872,027 | A | 10/1989 | Buskirk et al. ............... 347/19 |
| 5,148,534 | A | 9/1992 | Comerford ................. 711/164 |
| 5,530,753 | A | 6/1996 | Easter et al. .................... 380/4 |
| 5,761,566 | A | 6/1998 | Suzuki et al. ................. 399/12 |
| 5,831,649 | A | 11/1998 | Watrobski et al. ............ 347/67 |
| 5,949,467 | A | 9/1999 | Gunther et al. ............. 347/214 |
| 5,978,475 | A | 11/1999 | Schneier et al. ................ 380/4 |
| 6,019,461 | A | 2/2000 | Yoshimura et al. ........... 347/86 |
| 6,028,937 | A | 2/2000 | Tatebayashi et al. .......... 380/25 |
| 6,192,473 | B1 | 2/2001 | Ryan, Jr. et al. ............ 713/168 |
| 6,212,505 | B1 | 4/2001 | Herbert ...................... 705/408 |
| 6,263,170 | B1 | 7/2001 | Bortnem ...................... 399/13 |
| 6,299,274 | B1 | 10/2001 | Bolash et al. ................. 347/19 |
| 6,325,495 | B1 | 12/2001 | Foth ............................ 347/84 |
| 6,374,354 | B1 | 4/2002 | Walmsley et al. .......... 713/167 |
| 6,406,120 | B2 | 6/2002 | Pauschinger ................. 347/19 |
| 6,738,903 | B1 | 5/2004 | Haines ....................... 713/168 |
| 6,969,136 | B1 | 11/2005 | Matsumoto et al. ........... 347/7 |
| 2001/0020961 | A1 | 9/2001 | Pauschinger ................. 347/19 |
| 2002/0030712 | A1 | 3/2002 | Silverbrook ................. 347/19 |
| 2002/0030713 | A1 | 3/2002 | Silverbrook ................. 347/19 |
| 2002/0036668 | A1* | 3/2002 | Matsumoto et al. .......... 347/19 |

OTHER PUBLICATIONS

Laboratories, 2.1.6 What is a Hash Function?, p. 2, Figure. 2.7, http://www.rsasecurity.com/rsalabs/node.asp?id=2176.*

* cited by examiner

Primary Examiner—Stephen Meier
Assistant Examiner—Lam Nguyen
(74) Attorney, Agent, or Firm—Taylor & Aust, PC

(57) ABSTRACT

A method of authenticating a consumable used in an imaging device includes the steps of providing the consumable with a memory; monitoring usage of the consumable; determining whether the consumable has reached a usage threshold; and, if the consumable has reached the usage threshold, then performing the further steps of: renewing the consumable; generating an authentication code signifying the renewing of the consumable; and storing the authentication code in the memory.

36 Claims, 8 Drawing Sheets

METHOD OF AUTHENTICATING A CONSUMABLE

BACKGROUND OF THE INVENTION

1. Field of the Invention

The present invention relates to an imaging device, and, more particularly, to a method of authenticating a consumable used in an imaging device.

2. Description of the Related Art

In the imaging arts, a consumable is an item that is used by the imaging device during imaging. One example of a consumable is a supply item, such as for example, an ink supply tank, an ink jet printhead cartridge, a toner tank, or electrophotographic process (EP) cartridge, that contains a supply of an imaging substance, such as for example ink or toner, that is consumed during an imaging process. Examples of such an imaging device include an ink jet printer and/or copier, or an electrophotographic printer and/or copier. During imaging with the imaging device, the amount of the imaging substance is depleted. Thus, eventually, once the imaging substance supply of the supply item is exhausted, the supply item either may be discarded or may be replenished with imaging substance. In either event, the consumer must provide a new supply of imaging substance in order to continue imaging.

What is needed in the art is a method of authenticating a consumable, such as a supply item, used in an imaging device.

SUMMARY OF THE INVENTION

The present invention provides a method of authenticating a consumable used in an imaging device.

The invention, in one form thereof, relates to a method of authenticating a consumable used in an imaging device, including the steps of providing the consumable with a memory; monitoring usage of the consumable; determining whether the consumable has reached a usage threshold; and, if the consumable has reached the usage threshold, then performing the further steps of: renewing the consumable; generating an authentication code signifying the renewing of the consumable; and storing the authentication code in the memory.

In another form thereof, the present invention relates to a method of authenticating a consumable used in an imaging device, including the steps of providing the consumable with a memory having an authentication code stored therein, the authentication code signifying a renewal of the consumable; generating a verifying code based on a secret located in the imaging device and information stored in the memory of the consumable; and comparing the authentication code with the verifying code to determine whether the renewal was authorized.

In another form thereof, the present invention relates to a method of authenticating a consumable used in an imaging device, including the steps of providing the consumable with a memory; performing a first renewal of the consumable; generating a first authentication code signifying the first renewal; and storing the first authentication code in the memory of the consumable.

In another form thereof, the present invention relates to a method of authenticating a consumable used in an imaging device, including the steps of providing the consumable with a memory; performing a first renewal of the consumable; generating a first message authentication code (MAC1) signifying the first renewal; storing the MAC1 in the memory of the consumable; performing a second renewal of the consumable; generating a second message authentication code (MAC2) signifying the second renewal; and storing the MAC2 in the memory of the consumable.

In another form thereof, the present invention relates to a method of generating a mask for converting a first binary number having a first number of bits to a second binary number having a second number of bits, the first number of bits being greater than the second number of bits, including the steps of defining a key having a third number of bits, the third number of bits being divisible into the first number of bits to form a quotient; dividing the first binary number into a plurality of groups of bits, a number of the plurality of groups of bits being equal to the third number of bits of the key, each of the groups having a number of bits equal to the quotient; correlating each bit of the key to one group of the plurality of groups of bits of the first binary number; selecting from the plurality of groups of bits of the first binary number each group having a corresponding key bit having a predetermined binary state; and selecting at least one bit from each selected group of bits based on a mod function to form at least a portion of the second binary number.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
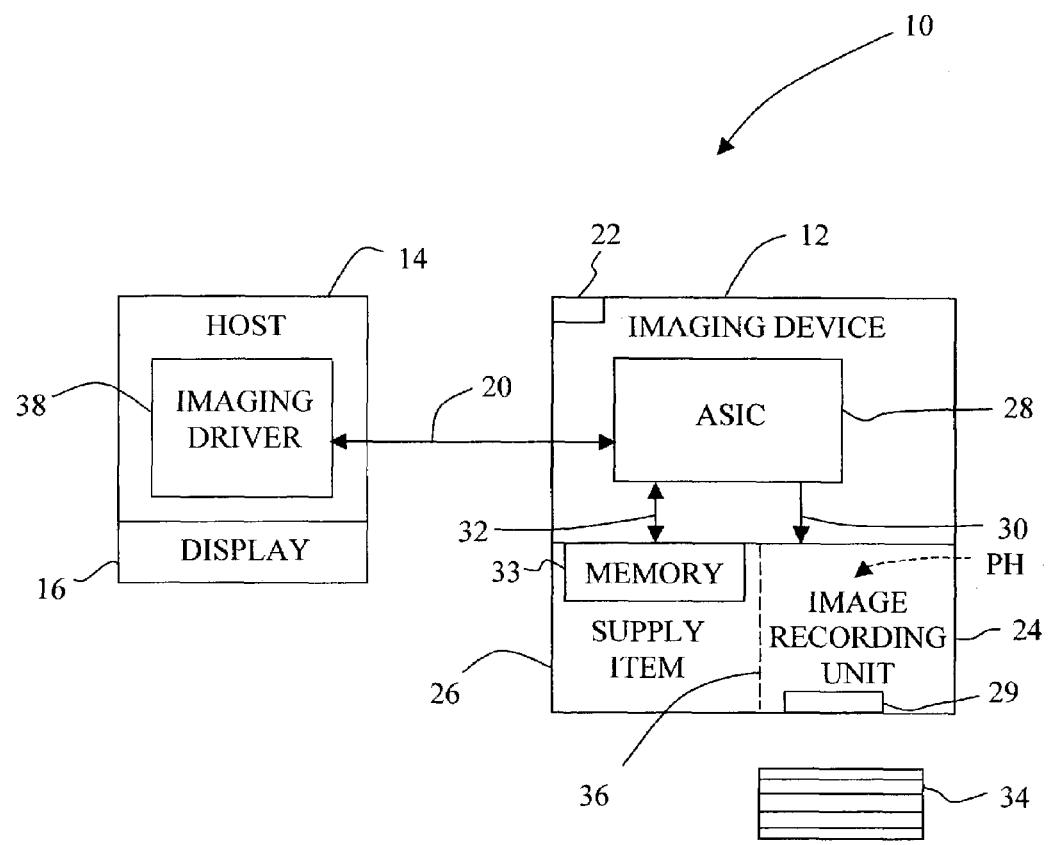
FIG. 1 is a diagrammatic depiction of a system used in association with the present invention.

Referring now to the drawings, and particularly to FIG. 1, there is shown a diagrammatic depiction of a system 10 used in association with the present invention. System 10 includes an imaging device 12 and a host 14. Imaging device 12 communicates with host 14 via a communications link 20.

Imaging device 12 includes a user interface 22, an image recording unit 24, a supply item 26 and an Application Specific Integrated Circuit (ASIC) 28. ASIC 28 communicates with image recording unit 24 via a communications link 30. ASIC 28 communicates with supply item 26 via a communications link 32. Imaging device 12 can be, for example, an ink jet printer and/or copier, or an electrophotographic printer and/or copier.

In the context of the examples for imaging device 12 given above, image recording unit 24 can be, for example, an ink jet printhead unit or an electrophotographic printing unit, and includes an imaging head 29 used for forming an image on a substrate 34, such as a sheet of print media or a photoconductive member. For convenience, each type of substrate 34 will be referred to by the element number 34, for example, print media 34. Supply item 26 can be, for example, an ink supply tank, an ink jet printhead cartridge (PH), a toner tank, or an electrophotographic process (EP) cartridge, each of which containing a supply of an imaging substance, such as for example ink or toner, that is consumed during an imaging process. Imaging device 12 uses the imaging substance contained in supply item 26 to form an image on print media 34. Print media 34 can be, for example, sheets of paper, fabric or transparencies.

Those skilled in the art will recognize that image recording unit 24 and supply item 26 may be formed as individual discrete units, or may be combined in an integral unit, these options being depicted by dashed line 36. For example, in ink jet technology, such an integral unit may be an ink jet printhead cartridge PH including an ink reservoir and an ink jet printhead formed as a unitary consumable. Thus, for convenience, the term "supply item" is used to encompass either the discrete configuration or the integral configuration described above, and is an example of a consumable. Preferably, supply item 26 has mounted thereto a memory 33 for storing information relating to supply item 26, more fully described below with respect to FIG. 2. In the case of ink jet printhead cartridge PH, memory 33 may be formed on a part of the printhead silicon.

Host 14 may be, for example, a personal computer including a display device 16, an input device (e.g., keyboard), a processor, input/output (I/O) interfaces, memory, such as RAM, ROM, NVRAM, and a mass data storage device, such as a hard drive, CD-ROM and/or DVD units. During operation, host 14 includes in its memory a software program including program instructions that function as an imaging driver 38 for imaging device 12. Imaging driver 38 is in communication with ASIC 28 of imaging device 12 via communications link 20. Imaging driver 38 facilitates communication between imaging device 12 and host 14, and provides formatted print data to imaging device 12.

Communications link 20 may be established by a direct cable or optical connection, or by a network connection such as for example an Ethernet local area network (LAN). Communications links 30 and 32 may be established, for example, by using standard electrical cabling or bus structures, or by wireless connection.

Figure 2:
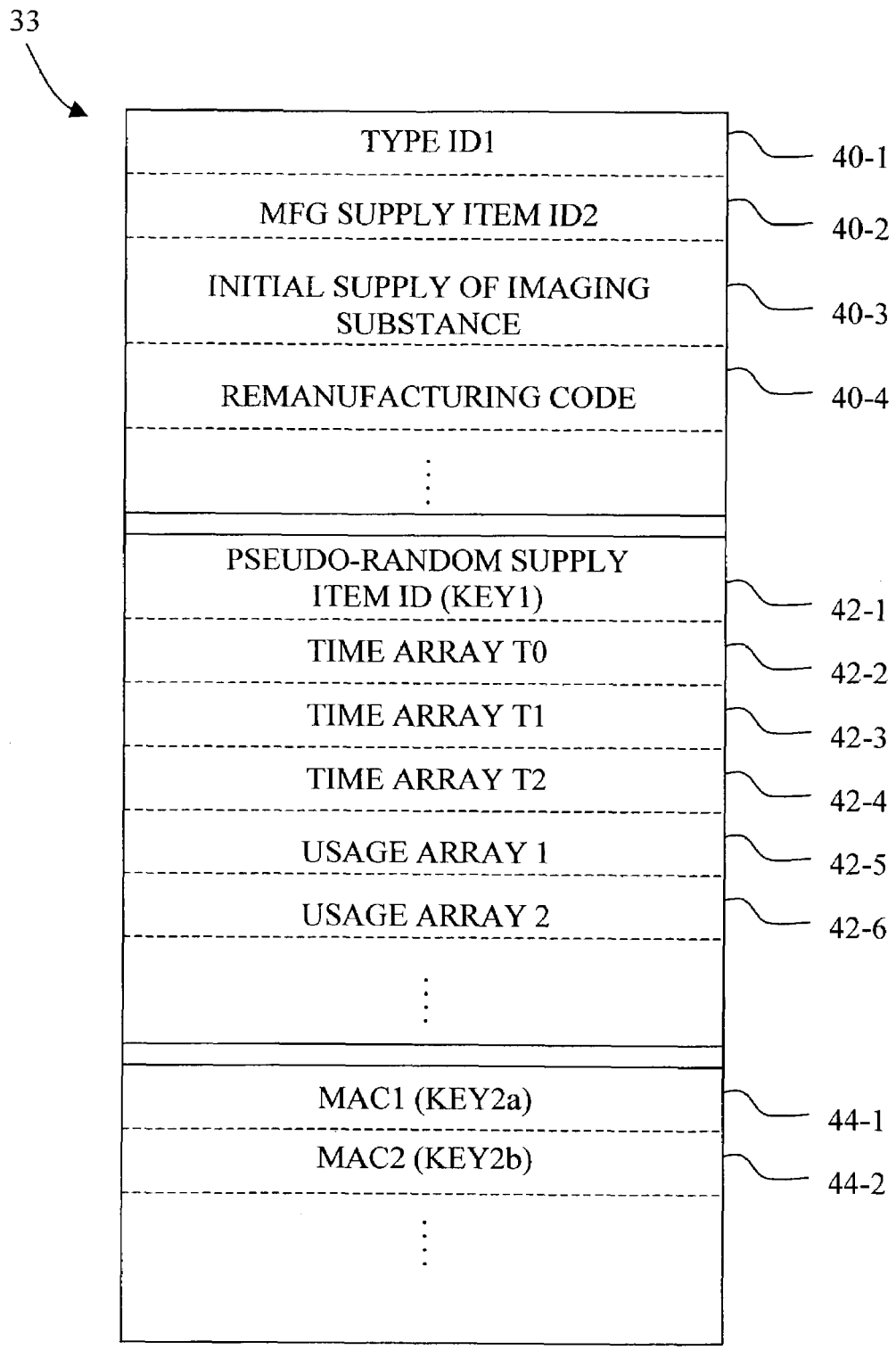
FIG. 2 is a graphical depiction of the memory of the consumable of FIG. 1.

FIG. 2 is a graphical depiction of memory 33 which for convenience is described as having a plurality of memory sections, namely, a memory section 40 that includes pre-programmed information generated during manufacturing, a memory section 42 that is programmed with information when supply item 26 is installed in imaging device 12 and during the use of imaging device 12, and a memory section 44 for storing information used for remanufacturing supply item 26. Actual memory locations within the above described memory sections need not be contiguous.

Memory section 40 includes a plurality of memory locations, including for example, memory locations 40-1, 40-2, 40-3 and 40-4. For example, in location 40-1 there can be stored an supply item type identification; in location 40-2 there can be stored an manufacturer's supply item identification, in location 40-3 there can be stored an initial amount of imaging substance; and, in location 40-4 there can be stored a remanufacturing code. The remanufacturing code may designate supply item 26 as either needing authentication after remanufacturing, or as not needing authentication after remanufacturing.

Memory section 42 includes a plurality of memory locations, including for example, memory locations 42-1, 42-2, 42-3, 42-4, 42-5, and 42-6. For example, in location 42-1 there can be stored a pseudo-random identification number (PID) for supply item 26; in location 42-2 there can be stored a time array T0 for storing a time of initial installation of supply item 26 in imaging device 12; in location 42-3 there can be stored a time array T1 for storing a time at which an imaging substance usage compensation algorithm is invoked; in location 42-4 there can be stored a time array T2 for storing a time at which it is predicted that, based on the imaging substance usage compensation algorithm, the available imaging substance supply will be depleted; in location 42-5 there is an array of usage bits that can be programmed to indicate the reaching of predetermined threshold levels of imaging substance consumption for supply item 26 as a new supply item; and in location 42-5 there is an array of usage bits that can be programmed to indicate the reaching of predetermined threshold levels of imaging substance consumption for supply item 26 as a renewed supply item.

The PID that is to be stored in location 42-1 can include a fixed portion and a randomly generated portion. The fixed portion can be provided by the manufacturer, such as for example, by using a portion, or all, of the manufacturer's supply item identification stored in location 40-2. The randomly generated portion may be generated by imaging device 12 using, for example, a re-circulating counter triggered by a free running clock. In one embodiment, the PID has a predetermined number of binary ones and zeros for any such PID generated.

In either of locations 42-5 or 42-6, each bit of the plurality of usage bits may represent a usage level corresponding to an amount of use of imaging substance from supply item 26. For example, each bit may represent a predefined amount of reduction in the quantity of imaging substance contained in supply item 26. As a more particular example, if location 42-5 has eight bits, each bit can represent approximately a 12.5 percent depletion of imaging substance from supply item 26. Each usage level bit may be programmed based on reaching an associated usage threshold which, for example, may be represented as an imaging substance dot count.

Memory section 44 includes a plurality of memory locations, including for example, memory locations 44-1 and 44-2. For example, in location 44-1 there can be stored a first message authentication code (MAC1), also sometimes referred to as KEY2a, and in location 44-2 there can be stored a second message authentication code (MAC2), also sometimes referred to as KEY2b. For example, MAC1 can be stored in memory location 44-1 to signify that the first renewal of supply item 26 was authorized, and MAC2 can be stored in memory location 44-2 to signify that the second renewal of supply item 26 was authorized. By attaching memory 33 to supply item 26, in essence, the stored information associated with supply item 26 can travel with supply item 26 from one imaging device to another.

Figure 3:
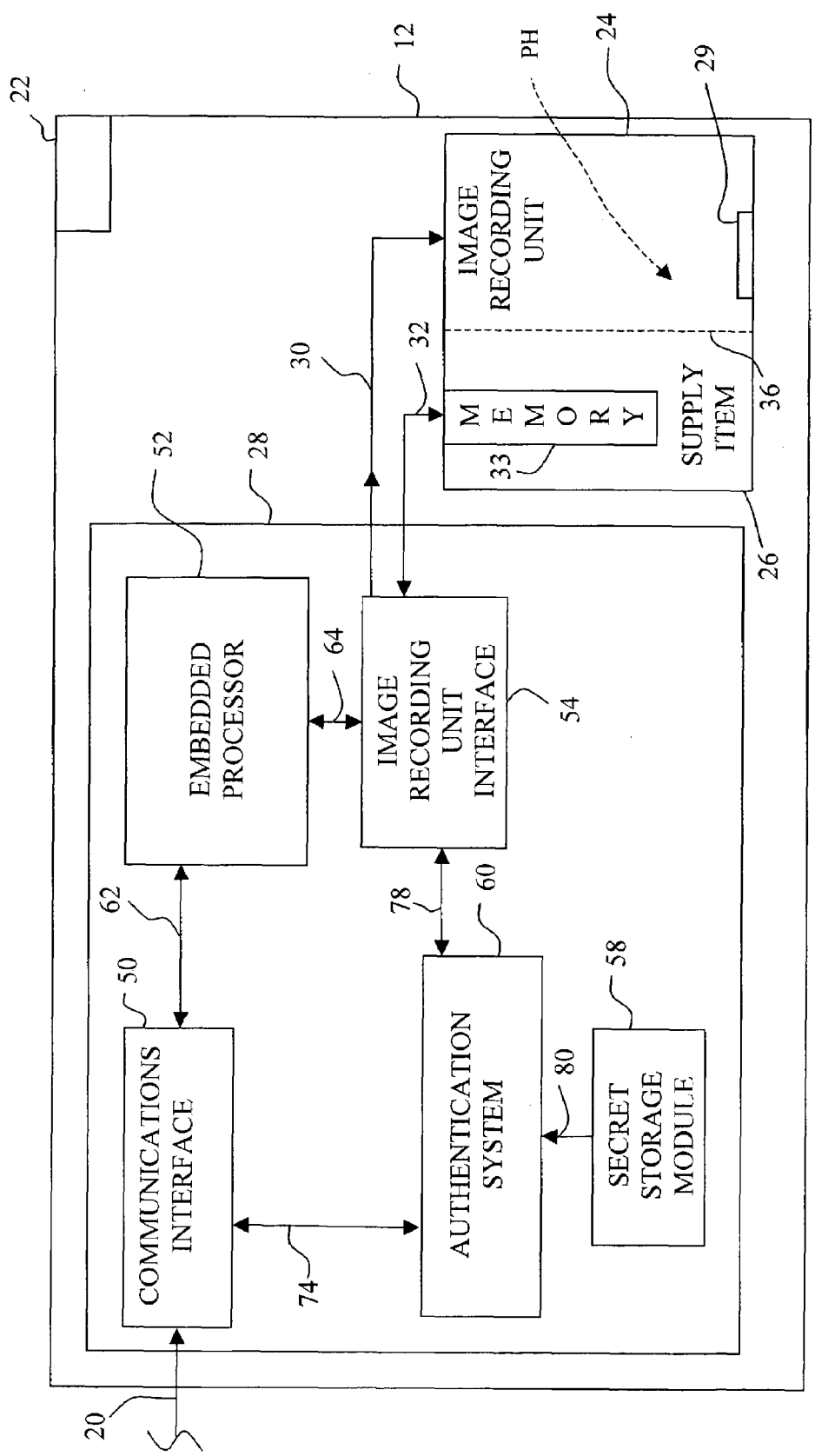
FIG. 3 is a block diagram showing functional blocks of the ASIC of FIG. 1.

FIG. 3 is a block diagram showing functional blocks of the ASIC 28 of FIG. 1. ASIC 28 includes a communications interface 50, an embedded processor 52, an imaging recording unit interface 54, a secret storage module 58 and an embedded authentication system (EAS) 60.

Alternatively, embedded authentication system (EAS) 60 may be located on supply item 26, such as for example, on the silicon containing memory 33, or located at some other location in imaging device 12, or located on host 14, for example in imaging driver 38. The decision where to locate embedded authentication system (EAS) 60 may be based on, for example, a desire to provide heightened security against physical tampering; and/or, a desire to provide heightened security against unauthorized programming access, such as by hackers.

Communications interface 50 facilitates communications with imaging driver 38 of host 14 via communications link 20 (see also FIG. 1). Embedded processor 52 is communicatively coupled to communications interface 50 via electrical path 62. Imaging recording unit interface 54 is communicatively coupled to embedded processor 52 via electrical path 64, is communicatively coupled to image recording unit 24 via communications link 30, and is communicatively coupled to memory 33 via communications link 32. Embedded authentication system (EAS) 60 is communicatively coupled to communications interface 50 via electrical path 74, is communicatively coupled to image recording unit interface 54 via electrical path 78, and is communicatively coupled to secret storage module 58 via electrical path 80.

Embedded processor 52 is used as a general controller for imaging device 12, and is used, for example, to control the feeding of print media 34 past printhead 29, and to control the operation of printhead 29, based on the formatted imaging data received from imaging driver 38.

EAS 60 is configured as firmware in ASIC 28, or alternatively is programmed into ASIC 28, to retrieve an authentication code, such as a message authentication code (MAC), if present, stored in memory 33 of supply item 26 and to execute a predefined authentication algorithm, such as a replication of the message authentication algorithm used for MAC generation, to generate a verifying code to verify that the renewal of supply item 26 was authorized. In other words, if the verifying code, e.g., MAC, generated by imaging device 12 is the same as the authentication code, e.g., MAC, that was stored in memory 33 during the renewal of supply item 26, then the renewal was authorized; otherwise, the renewal was not authorized. In order to verify each MAC as authentic, imaging device 12 will include in secret storage module 58 the secret used in generating the MAC. For example, if supply item 26 supports the storage of two MACs, MAC1 and MAC2, then imaging device 12 will contain in secret storage module 58 two separate 32-bit secrets (Sa and Sb) corresponding respectively to the MAC1 or MAC2 to be verified.

The type of renewal of supply item 26 will depend upon whether supply item 26 was subject to license. Types of renewals may include, for example, license renewal, imaging substance replenishing and supply item remanufacturing. For example, when the supply of available imaging substance is depleted, if supply item 26 is licensed and supply item 26 has a reserve amount of imaging substance to accommodate license renewals, the license can be renewed at which time a MAC will be supplied for storage in memory 33. If supply item 26 does not contain a reserve amount of imaging substance, supply item 26 can be refilled or remanufactured for continued use, such as for example, by replenishing the imaging substance supply of supply item 26, at which time a MAC will be stored in memory 33.

Figure 4A:
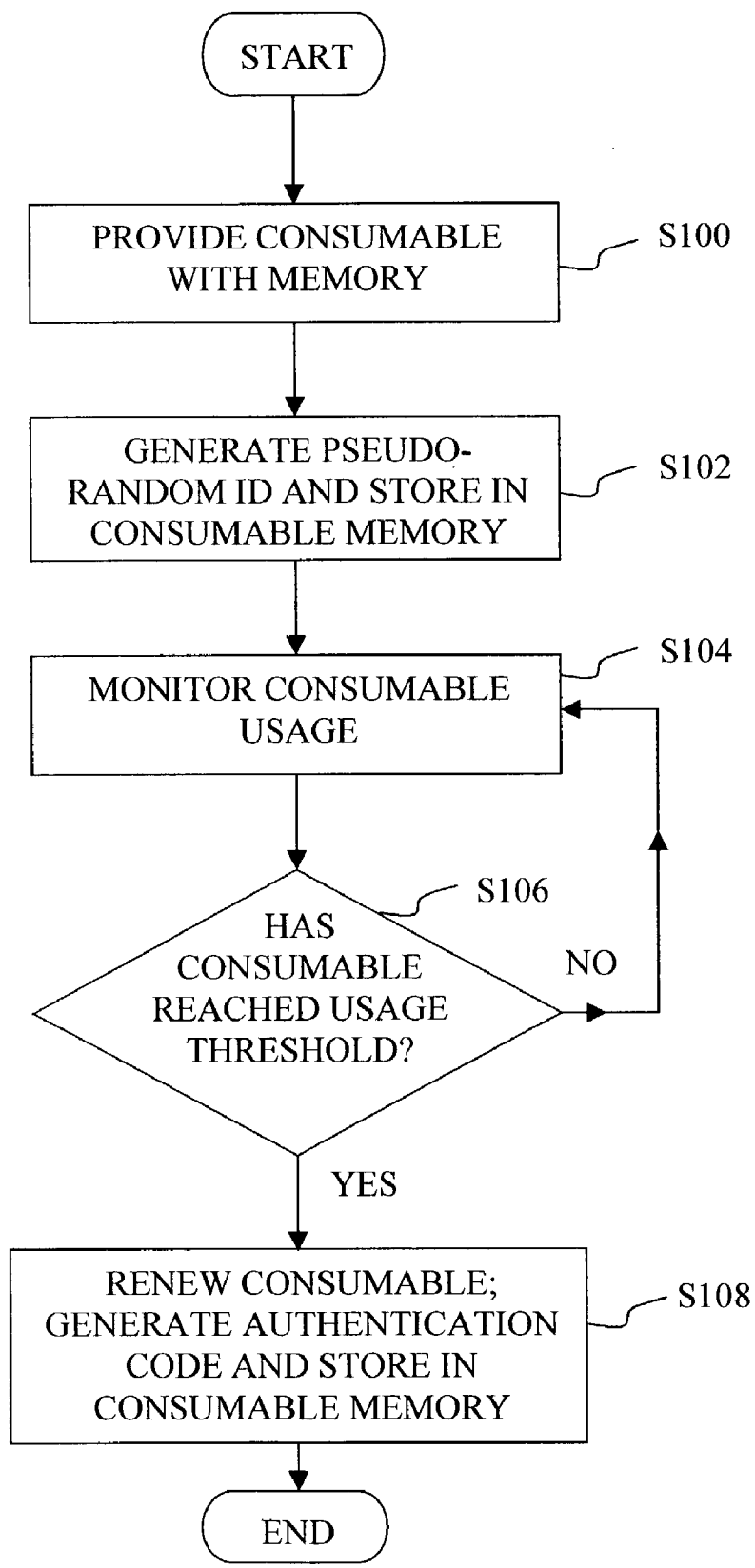
FIG. 4A is a flowchart of a general process of one aspect of a method of authenticating a consumable used in an imaging device, in accordance with the present invention.

FIG. 4A is a flowchart of a general process of one aspect of a method of authenticating a consumable used in an imaging device, in accordance with the present invention.

At step S100, a consumable, such as supply item 26, having memory 33 is provided for installation in imaging device 12.

At step S102, a pseudo-random supply item identification number is generated, for example, in ASIC 28 of imaging device 12, and is stored in location 42-1 of memory 33 of supply item 26. Also, other information, such as time information, e.g., T0, may be stored. It is to be noted, however, that the fixed portion of the pseudo-random supply item identified number is pre-stored during manufacturing, as well as some other preset values, such as for example, times T1 and T2.

At step S104, the usage of supply item 26 is monitored. For example, where supply item 26 is an ink jet printhead cartridge PH, usage of ink from the ink jet printhead cartridge PH can be monitored by counting the number of ink drops ejected from the printhead, which may for example occur by counting the number of actuations of ink expelling elements, or the number of drops commanded to be expelled by the imaging data. Such a drop count may be compensated to account for such factors as, for example, ink evaporation, temperature variations, humidity variations, etc.

At step S106, it is determined whether supply item 26 has been used to an extent to reach a predefined usage threshold. In practice, several usage thresholds may be defined, wherein upon reaching a subsequent threshold, another bit of usage array 1 or usage array 2, stored in locations 42-5 and 42-6 of memory 33, respectively, can be set to signify the attainment of next level of usage. An estimate as to the amount of remaining available imaging substance in supply item 26 may be made by simply subtracting the usage data from the initial supply amount stored in location 40-3 of memory 33 of supply item 26. One of the predefined thresholds, however, will be designated as the threshold at which the amount of remaining available imaging substance has been depleted. Prior to reaching this threshold, the process returns to step 104 to continuing monitoring usage of supply item 26. Upon reaching this threshold, the process proceeds to step S108.

At step S108, supply item 26 may be renewed. As stated above, the type of renewal of supply item 26 will depend upon whether supply item 26 was subject to license. For example, in view of the depleted supply of available imaging substance, if supply item 26 is licensed and supply item 26 has a reserve amount of imaging substance to accommodate license renewals, the license can be renewed at which time an authentication code, such as a message authentication code (MAC), will be supplied for storage in memory 33. If supply item 26 does not contain a reserve amount of imaging substance, supply item 26 can be renewed for continued use, such as for example, by replenishing the imaging substance supply of supply item 26. In either case, the presence of a valid authentication code will signify that the renewal of supply item 26 was authorized.

Figure 4B:
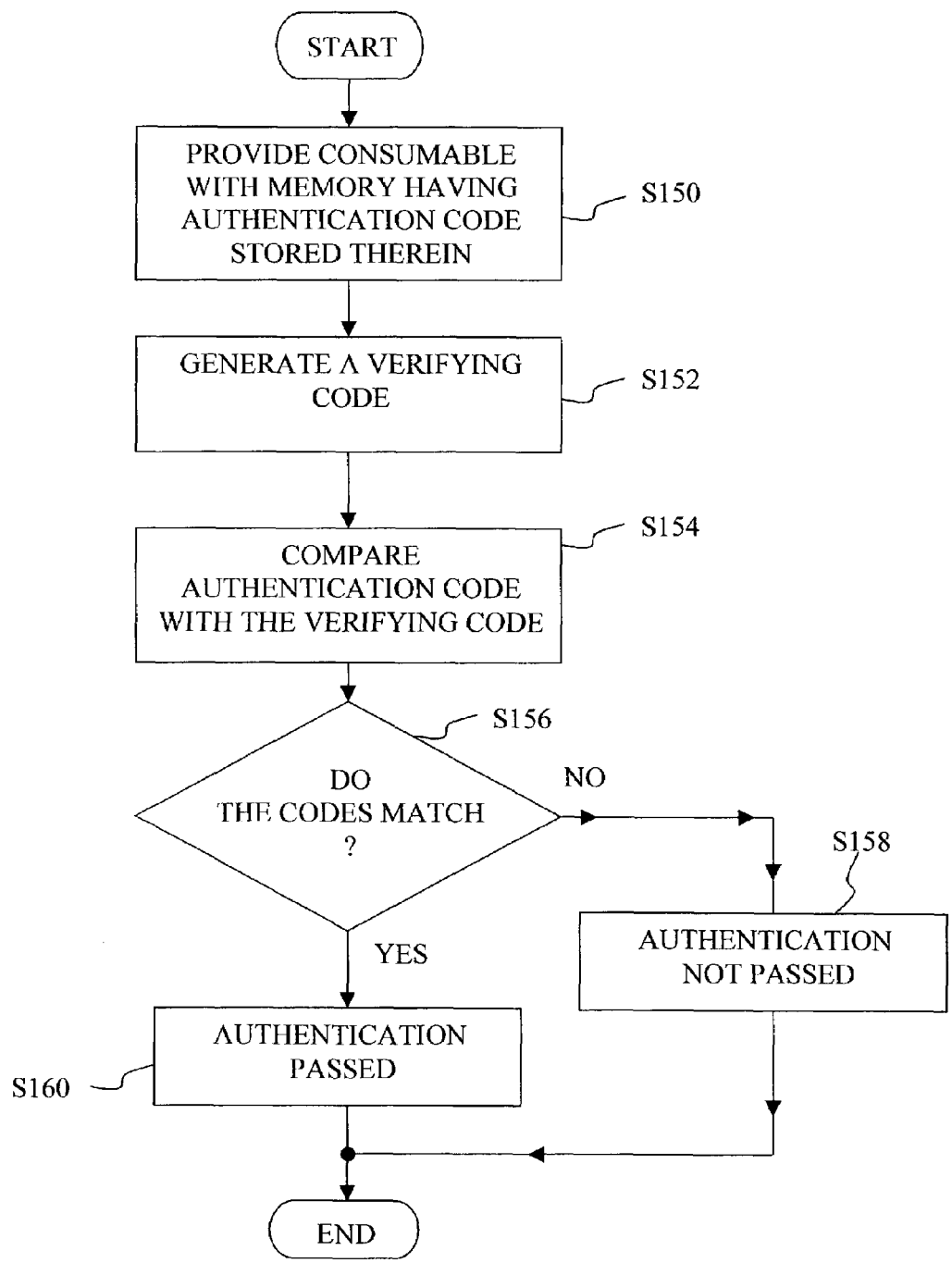
FIG. 4B is a flowchart of a general process of another aspect of a method of authenticating a consumable used in an imaging device, in accordance with the present invention.

FIG. 4B is a flowchart of a general process of another aspect of a method of authenticating a consumable used in an imaging device, in accordance with the present invention.

At step S150, there is provided a consumable, such as supply item 26, provided with memory 33 that has an authentication code, such as a MAC, stored therein. The authentication code signifies a renewal of the consumable, such as that described above with respect to FIG. 4A. Supply item 26 may be an ink jet printhead cartridge PH with memory 33 attached to ink jet printhead cartridge PH, e.g., wherein memory 33 is integral with printhead 29 of ink jet printhead cartridge PH.

At step S152, imaging device 12 generates a verifying code based on a secret located in the imaging device 12 and information stored in memory 33 of the consumable, e.g., supply item 26. In a preferred implementation of the invention, the authentication code and the verifying code are generated independently using the same algorithm, such as a hashing algorithm. The information stored in memory 33 may include, for example, the pseudo-random identification number of supply item 26 and time parameters (e.g., T0, T1 and T2). The pseudo-random identification number may be generated by imaging device 12, such as through a random generation process, at a time of installation of supply item 26 in imaging device 12.

At step S154, imaging device 12 compares the authentication code stored in memory 33 with the verifying code generated at step S152 to determine whether the renewal was authorized.

At step S156, it is determined whether the authentication code matches the verification code.

If the result at step S156 is NO, the process proceeds to step S158 where it is indicated to the user that the authentication of the consumable, e.g., supply item 26, has not passed. In other words, if the renewal is not authorized, then appropriate action is taken, such as for example, by advising the user to acquire an authorized replacement for supply item 26 by posting a display at user interface 22 or at display 16 of host 14. As stated above, the renewal of the consumable may be, for example, a replenishing of an imaging substance supply in supply item 26 or a renewal of a license to use supply item 26.

If the result at step S156 is YES, the process proceeds to step S160 where it is indicated to the user that the authorization has passed. In other words, if the renewal was authorized, then normal printing may proceed.

Exemplary processes for generating a MAC suitable for use as the authentication code or verifying code are described below with respect to FIGS. 5 and 6. The MAC generation processes of FIGS. 5 and 6 utilize a keyed hashed message authentication coded (HMAC) protocol. A hash function is a one-way function such that it is computationally unfeasible to construct the input given a particular output. The output of the hash function may be pseudorandom such that if one bit of the input changes, there is a 50% probability that each bit of the output will change. One example of a hashing algorithm is commonly referred to as the Secure Hash Algorithm (SHA-1). This algorithm is specified by the Federal Information Standards Publication 180-1, which is incorporated herein by reference, and is available through the Internet at http://www.it1.nist.gov/fipspubs/fip180-1.htm, or http://csrc.nist.gov/publications/fips/fips180-2/fips180-2.pdf.

The generation of MAC1, also referred to herein as Key2a, to complete a first renewal of supply item 26 will now be described with respect to FIG. 5. While the example of FIG. 5 is described for convenience with supply item 26 being ink jet cartridge PH, those skilled in the art will recognize that the process of FIG. 5 is adaptable to other types of supply items and/or consumables. Also, reference to specific numbers of bits used in association with particular variables is exemplary, and may be changed to accommodate the design constraints of a particular system. Also, it is to be understood that the same algorithm used to generate the MAC for renewal of the consumable, e.g., supply item 26, printhead cartridge PH, etc., can be used by imaging device 12 and/or host 14 in generating the verifying code MAC to be compared with the MAC stored in memory 33 to verify the authenticity of the renewed consumable.

At steps S200 and S202, it is determined whether the ink jet printhead cartridge PH is a monochrome cartridge, a color dye cartridge, or a color pigment cartridge. Of course, these steps can be easily expanded to cover other ink types.

Depending upon the ink type, e.g., mono, color dye or color pigment, at steps S204, S206 or S208 a specific 32 bit secret is selected, designated as SM for mono, SD for color dye, and SP for color pigment.

Also at step S210, a 32-bit secret (Sa) corresponding to MAC1 (Key2a) is selected.

At step S212, a 64 bit secret is created by concatenating secret Sa with one of secrets SM, SD or SP.

At steps S214, various parameters stored in memory 33 of ink jet printhead cartridge PH are retrieved. In this example, step S214-1 retrieves the 5-bit time parameter T0, step S214-2 retrieves the 3-bit time parameter T1, step S214-3 retrieves the 3-bit time parameter T2, step S214-4 retrieves the 4-bit ID1 from location 40-1, step S214-5 retrieves the 4-bit ID2 from location 40-2, and step S214-6 retrieves the 32-bit pseudo-random ID (Key1) from location 42-1.

At step S216, the 64-bit secret from step S212 is concatenated with the parameters retrieved in steps S214 from memory 33 of ink jet printhead cartridge PH to form a 115-bit output.

At step S218, the 115-bit output from step S216 will be processed using a SHA-1 algorithm to generate a 160-bit output digest.

At step S220, the 64-bit secret generated at step S212 is concatenated with the 160-bit output digest of step S218 to form a 224-bit input to step S220, which in turn is processed using a SHA-1 algorithm to generate a second 160-bit output digest.

Figure 5:
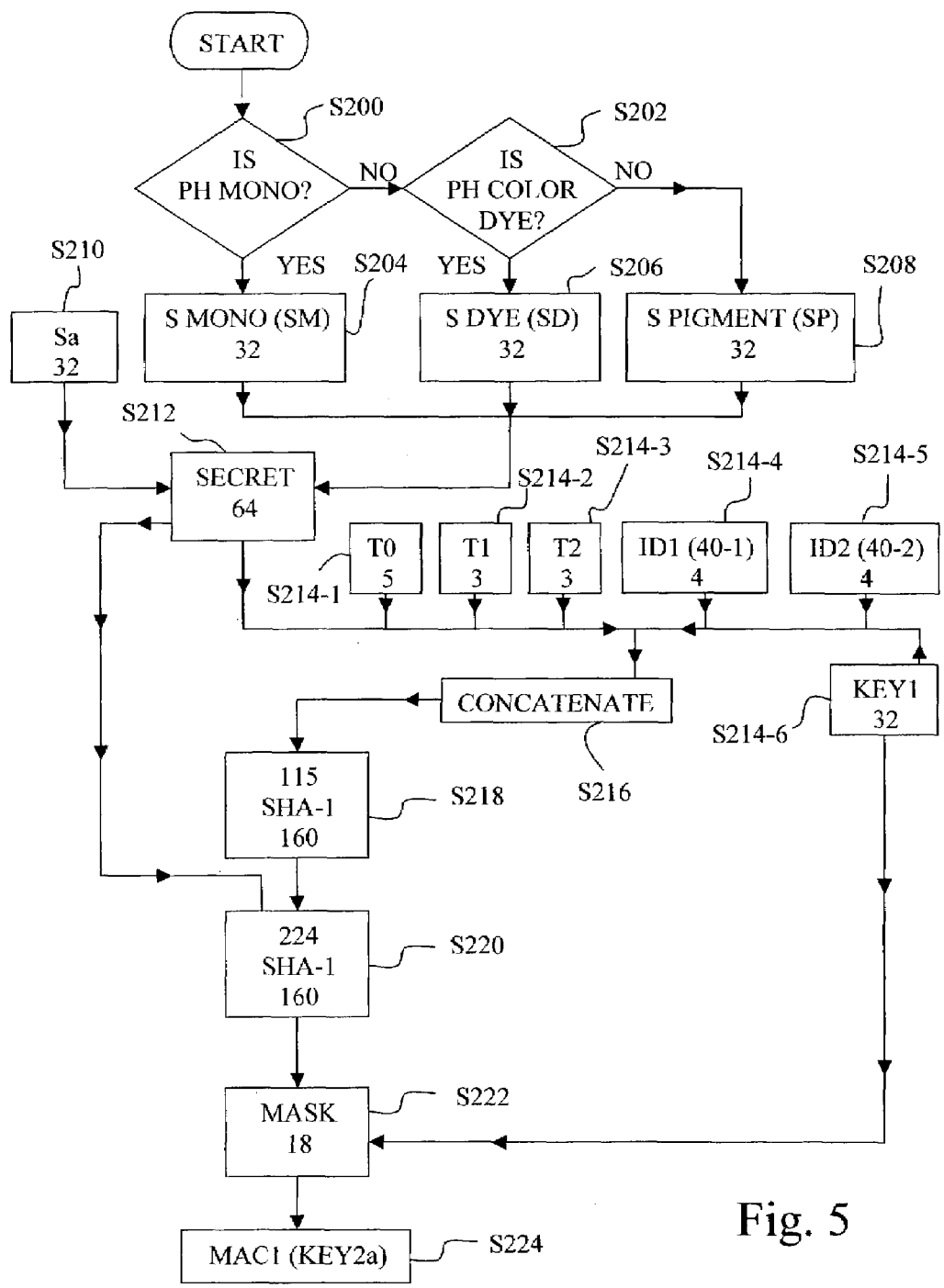
FIG. 5 is a flowchart depicting an exemplary process for generating a MAC suitable for use as the authentication code or verifying code, in accordance with the present invention.

Thus, for example, for the process of FIG. 5 through step S220, assuming a color dye printhead cartridge for the first renewal the pseudo-code will be: SHA (SaSDSHA (Key1ID1ID2T0T1T2SDSapad)pad), wherein "" represents concatenation, "pad" is used in the SHA-1 algorithm to increase the input to be a 512-bit input, and SHA is the SHA-1 algorithm.

Figure 7:
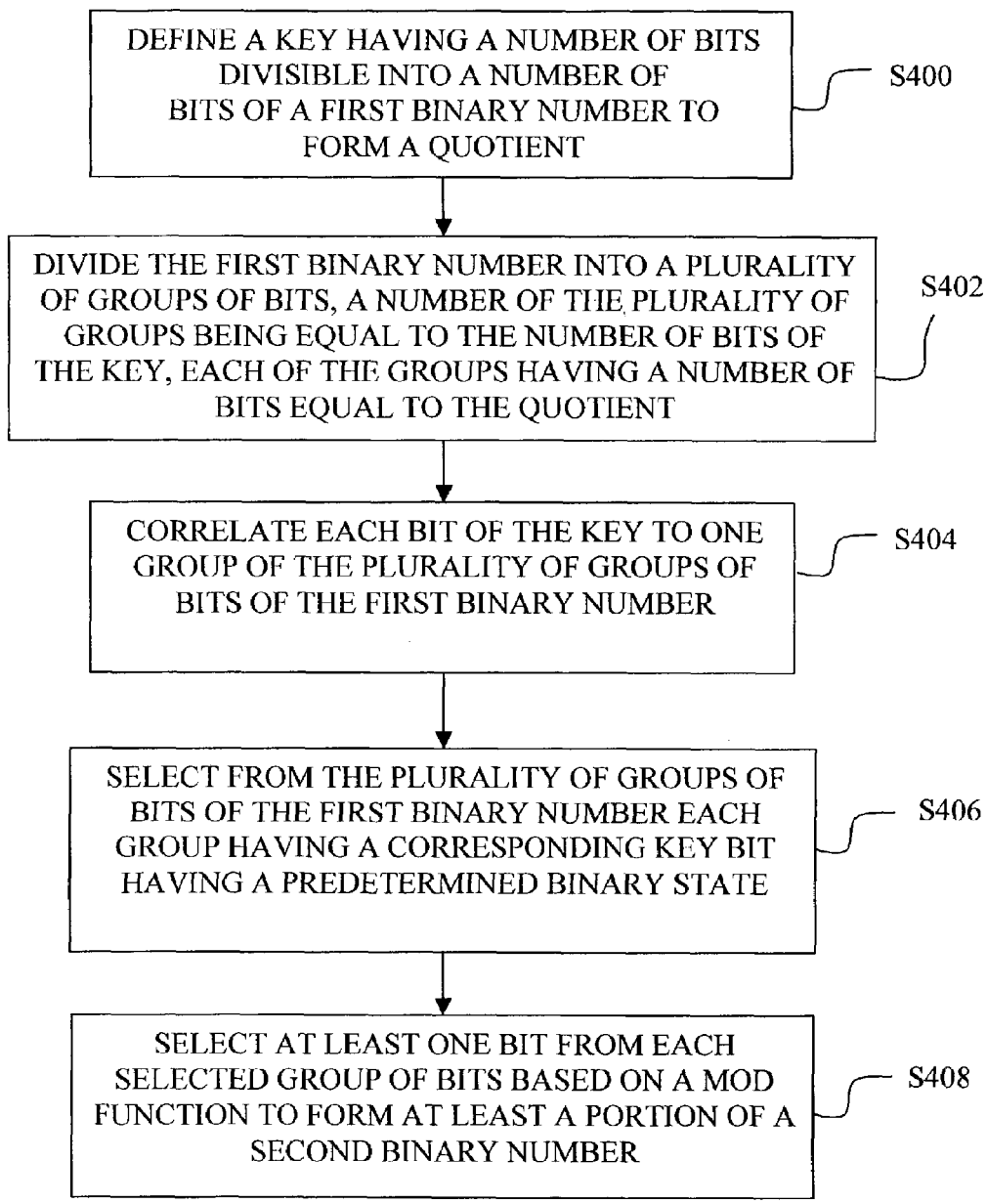
FIG. 7 is a flowchart depicting an exemplary method of generating a mask for use as the mask of FIGS. 5 and 6.

At step S222, a mask using the 32-bit pseudo-random ID (Key1) from location 42-1, which will be described in more detail below with respect to FIG. 7, is used to reduce the 160-bit output digest of step S220 to 18 bits to form MAC1 (i.e., Key2a).

At step S224, the 18-bit MAC1 is stored in memory location 44-1 (see FIG. 2) of memory 33 of ink jet printhead cartridge PH.

Figure 6:
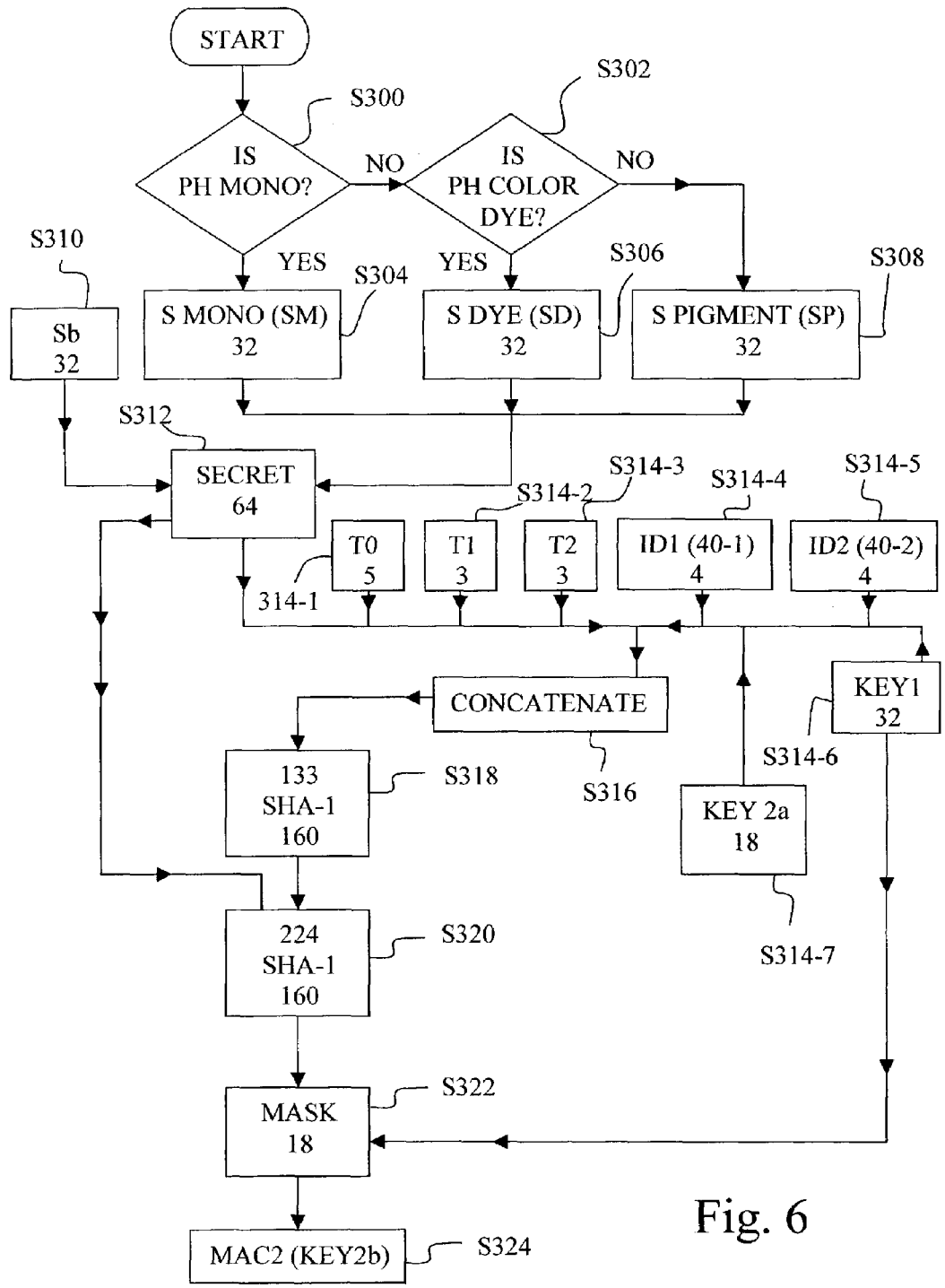
FIG. 6 is a flowchart depicting another exemplary process for generating a MAC suitable for use as the authentication code or verifying code, in accordance with the present invention.

To accommodate a second renewal of supply item 26, e.g., ink jet printhead cartridge PH, the process of FIG. 6 may be used. The generation of MAC2, also referred to herein as Key2b, to complete a second renewal of supply item 26 will now be described with respect to FIG. 6. While the example of FIG. 6 is described for convenience with supply item 26 being ink jet printhead cartridge PH, those skilled in the art will recognize that the process of FIG. 6 is adaptable to other types of supply items and/or consumables. Also, reference to specific numbers of bits used in association with particular variables is exemplary, and may be changed to accommodate the design constraints of a particular system. Also, it is to be understood that the same algorithm used generate the MAC for renewal of the consumable, e.g., supply item 26, printhead cartridge PH, etc., can be used by imaging device 12 in generating the verifying MAC to be compared with the MAC stored in memory 33 to verify the authenticity of the renewed consumable.

At steps S300 and S302, it is determined whether the ink jet printhead cartridge PH is a monochrome cartridge, a color dye cartridge, or a color pigment cartridge. Of course, these steps can be easily expanded to cover other ink types.

Depending upon the ink type, e.g., mono, color dye or color pigment, at steps S304, S306 or S308 a specific 32 bit secret is selected, designated as SM for mono, SD for color dye, and SP for color pigment.

Also, at step S310, a 32-bit secret (Sb) corresponding to MAC2 (Key2$b$), is selected.

At step S312, a 64 bit secret is created by concatenating secret Sb with one of secrets SM, SD or SP.

At steps S314, various parameters stored in memory 33 of ink jet printhead cartridge PH are retrieved. In this example, step S314-1 retrieves the 5-bit time parameter T0, step S314-2 retrieves the 3-bit time parameter T1, step S314-3 retrieves the 3-bit time parameter T2, step S314-4 retrieves the 4-bit ID1 from location 40-1, step S314-5 retrieves the 4-bit ID2 from in location 40-2, step S314-6 retrieves the 32-bit pseudo-random ID (Key1) from location 42-1, and step S314-7 retrieves the 18-bit Key2$a$ (MAC1) from location 44-1.

At step S316, the 64-bit secret from step S312 is concatenated with the parameters retrieved in steps S314 from memory 33 of ink jet printhead cartridge PH.

At step S318, the 133-bit output from step S316 will be processed using a SHA-1 algorithm to generate a 160-bit output digest.

At step S320, the 64-bit secret generated at step S312 is concatenated with the 160-bit output of step S318 to form a 224-bit input to step S320, which in turn is processed using a SHA-1 algorithm to generate a second 160-bit output digest.

Thus, for example, for the process of FIG. 6 through step S320, assuming a mono printhead cartridge for the second renewal the pseudo-code will be: SHA (SbSMSHA (Key1ID1ID2Key2$a$T0T1T2SMSb pad)pad), wherein "**" represents concatenation, "pad" is used in the SHA-1 algorithm to increase the input to the SHA-1 algorithm to a 512-bit input, and SHA is the SHA-1 algorithm.

At step S322, a mask using the 32-bit pseudo-random ID (Key1) from location 42-1, which will be described in more detail below with respect to FIG. 7, is used to reduce the 160-bit output digest of step S320 to 18 bits to form MAC2 (i.e., Key2$b$).

At step S324, the 18-bit MAC2 is stored in memory location 44-2 (see FIG. 2) of memory 33 of ink jet printhead cartridge PH.

In order to generate a verifying MAC, for example, the same process described above is used, wherein the EAS 60 residing in ASIC 28 of imaging device 12 accesses a secret residing in secret storage module 58, and accesses memory 33 of supply item 26 to read the information pertaining to supply item 26, such as for example, the pseudo-random identification number of location 42-1; time values T0, T1 and T2 of locations 42-2, 42-3 and 42-4, which EAS 60 can then use to generate the MAC. Once the verifying MAC is generated, it can be compared to the respective MAC stored in memory 33 to determine the authenticity of the consumable. For example, if the verifying MAC equals the respective MAC stored in memory 33, then the consumable, e.g., supply item 26, has been verified as being authentic.

FIG. 7 shows an exemplary method of generating the mask mentioned above at step S222 of FIG. 5 and S322 of FIG. 6. In general, the method converts a first binary number having a first number of bits, e.g., such as a 160-bit digest output, to a second binary number having a second number of bits, e.g., an 18-bit MAC. As in the example, the number of bits of the first binary number is greater than the number of bits of the second binary number.

At step S400, a key, such as Key1, is defined that has a third number of bits divisible into the first number of bits of the first binary number to form a quotient, preferably without a remainder. For example, if the key has 32 bits, then 160 divided by 32 is 5. As previously stated, Key 1 is a 32-bit number corresponding to the pseudo-random supply item ID, stored at location 42-1 in memory 33. Without knowledge of Key1, the output of the mask cannot be predicted. Key1 (32 bits) may be defined to have sixteen "ones", wherein the sixteen "ones" may be used as the basis for the mask.

At step S402, the first binary number is divided into a plurality of groups of bits. The number of the plurality of groups is equal to the number of bits of the key. Each of the groups has a number of bits equal to the quotient. In the present example, the 160-bit digest output is divided into 32 groups of 5 bits.

At step S404, each bit of the key is correlated to one group of the plurality of groups of bits of the first binary number. For example, this means that each bit of Key1 (32 bits) has a possibility of lining up with five bits of the 160-bit digest output. For example, bit zero of Key1 will line up with bits 0-4 of the digest output, bit one of Key1 will line up with bits 5-9 of the digest output, bit two of Key1 will line up with bits 10-14 of the digest, etc.

At step S406, the method selects from the plurality of groups of bits of the first binary number each group having a corresponding key bit having a predetermined binary state. The predetermined binary state is one of a binary one (1) and a binary zero (0). For example, if the predetermined binary state is one (1), then for each one (1) in the key, the corresponding group of five bits from the first number is selected. Thus, for example, assuming a 32-bit key, and assuming that there were 16 "ones" in the 32-bit key, then at this stage there has been defined 16 groups of bits for use in generating the second number.

At step S408, at least one bit from each selected group of bits is selected based on a mod function to form at least a portion of the second binary number, e.g., the MAC. For example, a mod5 function would select between all five of the bits in a group, and a mod4 function would select between four of the five bits of a group. In some implementations it may be desirable to use mod4 since a mod4 function is much more efficient on a microprocessor. However, by using mod4, in this example this will mean that there are 32 bits (out of the 160) that will not have the possibility of being chosen. Once the bit from each group is chosen, then the bits are concatenated to form at least a portion of the second binary number. In this example, the MAC now has 16 bits.

If, however, a number of bits greater than 16 is desired, then one or more bits from the first binary number, e.g., bits 5 and 150, can be selected from the first binary number for concatenation with the portion of the second number generated directly through the masking process. Accordingly, in this example, the two addition bits (bit 5 and bit 150) can be used in conjunction with the 16 masked bits to form an 18-bit MAC.

The following is an exemplary pseudo code for implementing the method of FIG. 7, so as to convert the 160-bit digest to the 18-bit MAC.

For bits 0 through 15 of MAC:
HD=HMAC Digest
Let j=0
Let i=0 to 31
If bit i of Key1=1
Bit j of MAC=the value of HD bit (5*(bit i of Key1+1)−Key1 mod 4-1)
j=j+1
End
For bits 16 and 17 of MAC:
Bit 16 of MAC=bit 150 of HD
Bit 17 of MAC=bit 5 off HD.

Imaging device 12 will read memory locations 44-1 or 44-2 to determine whether there is at least one "one" bit set. If there is at least one bit set, then imaging device 12 will attempt to validate the MAC value.

Thus, for example, in summary, the mask method of the invention can be used in the methods of FIGS. 5 and 6 to convert the 160-bit output digest of the HMAC operation at steps S220 and S320 to the 18-bit value of the MAC to be stored in memory 33, such as at one of locations 44-1 and 44-2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating an authentication code for a consumable, comprising:
    assigning an identification number to said consumable;
    processing an input including at least said identification number, using a first algorithm, to generate a preliminary number different from said identification number;
    compressing said preliminary number using a compression algorithm that utilizes said identification number to generate an authentication value for use in authenticating said consumable, said compressing step converting said preliminary number having a first number of bits to said authentication value having a second number of bits, said first number of bits being greater than said second number of bits;
    determining a third number of bits in said identification number;
    dividing said preliminary number into a plurality of groups of bits, a number of said plurality of groups of bits being equal to said third number of bits of said identification number, each of said groups having a number of bits equal to said quotient;
    correlating each bit of said identification number to one group of said plurality of groups of bits of preliminary number;
    selecting from said plurality of groups of bits of said preliminary number, each group having a corresponding identification number bit having a predetermined binary state; and
    selecting at least one bit from each selected group of bits based on a mod function to form at least a portion of said authentication value.

2. The method of claim 1, wherein said preliminary number is an output digest of a hashing function.

3. The method of claim 1, wherein said mod function is a mod4 function.

4. The method of claim 1, wherein said predetermined binary state is one of a binary one and a binary zero.

5. The method of claim 1, further comprising the step of concatenating at least one bit from said preliminary number with said portion of said authentication value to form said authentication code.

6. A supply item including an authentication system, said authentication system configured to perform the steps of:
    processing an input including at least an identification number assigned to said supply item, using a first algorithm, to generate a preliminary number different from said identification number;
    compressing said preliminary number using a compression algorithm that utilizes said identification number to generate an authentication value for use in authenticating said supply item, said compressing step converting said preliminary number having a first number of bits to said authentication value having a second number of bits, said first number of bits being greater than said second number of bits;
    determining a third number of bits in said identification number;
    dividing said preliminary number into a plurality of groups of bits, a number of said plurality of groups of bits being equal to said third number of bits of said identification number, each of said groups having a number of bits equal to said quotient;
    correlating each bit of said identification number to one group of said plurality of groups of bits of preliminary number;
    selecting from said plurality of groups of bits of said preliminary number, each group having a corresponding identification number bit having a predetermined binary state; and
    selecting at least one bit from each selected group of bits based on a mod function to form at least a portion of said authentication value.

7. The supply item of claim 6, wherein said preliminary number is an output digest of a hashing function.

8. The supply item of claim 6, wherein said mod function is a mod4 function.

9. The supply item of claim 6, wherein said predetermined binary state is one of a binary one and a binary zero.

10. The supply item of claim 6, further comprising the step of concatenating at least one bit from said preliminary number with said portion of said authentication value to form an authentication code.

11. The supply item of claim 10, said authentication code being stored in a memory of said supply item.

12. A method for authenticating a consumable used by an imaging device, wherein the method comprises supplying an authentication code for comparison with a verifying code, wherein if the verifying code matches the authentication code the consumable is authenticated; and wherein the verifying code is generated by a method comprising:
    using a first algorithm to generate a preliminary number different from an identification number;
    compressing said preliminary number using a compression algorithm that utilizes said identification number to generate the verifying code, said compressing step converting said preliminary number having a first number of bits to said authentication value having a second number of bits, said first number of bits being greater than said second number of bits;

determining a third number of bits in said identification number;

dividing said preliminary number into a plurality of groups of bits, a number of said plurality of groups of bits being equal to said third number of bits of said identification number, each of said groups having a number of bits equal to said quotient;

correlating each bit of said identification number to one group of said plurality of groups of bits of preliminary number;

selecting from said plurality of groups of bits of said preliminary number, each group having a corresponding identification number bit having a predetermined binary state; and selecting at least one bit from each selected group of bits based on a mod function to form at least a portion of said authentication value.

13. The method of claim 12, wherein said preliminary number is an output digest of a hashing function.

14. The method of claim 12, wherein said mod function is a mod4 function.

15. The method of claim 12, wherein said predetermined binary state is one of a binary one and a binary zero.

16. The method of claim 12, further comprising the step of concatenating at least one bit from said preliminary number with said portion of said authentication value to form said authentication code.

17. A verifying code for a consumable used by an imaging device and generated by a method, comprising:

processing an input including at least an identification number associated with the consumable, using a first algorithm to generate a preliminary number different from said identification number;

compressing said preliminary number using a compression algorithm that utilizes said identification number to generate the verifying code, said compressing step converting said preliminary number having a first number of bits to said authentication value having a second number of bits, said first number of bits being greater than said second number of bits;

determining a third number of bits in said identification number;

dividing said preliminary number into a plurality of groups of bits, a number of said plurality of groups of bits being equal to said third number of bits of said identification number, each of said groups having a number of bits equal to said quotient; correlating each bit of said identification number to one group of said plurality of groups of bits of preliminary number;

selecting from said plurality of groups of bits of said preliminary number, each group having a corresponding identification number bit having a predetermined binary state; and selecting at least one bit from each selected group of bits based on a mod function to form at least a portion of said authentication value.

18. The method of claim 17, wherein said preliminary number is an output digest of a hashing function.

19. The method of claim 17, wherein said mod function is a mod4 function.

20. The method of claim 17, wherein said predetermined binary state is one of a binary one and a binary zero.

21. The method of claim 17, further comprising the step of concatenating at least one bit from said preliminary number with said portion of said authentication value to form said authentication code.

22. An authentication code for a consumable used by an imaging device, wherein the authentication code matches a verifying code that is generated by a method, comprising:

processing an input including at least an identification number associated with the consumable, using a first algorithm to generate a preliminary number different from said identification number;

compressing said preliminary number using a compression algorithm that utilizes said identification number to generate the verifying code, said compressing step converting said preliminary number having a first number of bits to said authentication value having a second number of bits, said first number of bits being greater than said second number of bits;

determining a third number of bits in said identification number;

dividing said preliminary number into a plurality of groups of bits, a number of said plurality of groups of bits being equal to said third number of bits of said identification number, each of said groups having a number of bits equal to said quotient;

correlating each bit of said identification number to one group of said plurality of groups of bits of preliminary number;

selecting from said plurality of groups of bits of said preliminary number, each group having a corresponding identification number bit having a predetermined binary state; and selecting at least one bit from each selected group of bits based on a mod function to form at least a portion of said authentication value.

23. The method of claim 22, wherein said preliminary number is an output digest of a hashing function.

24. The method of claim 22, wherein said mod function is a mod4 function.

25. The method of claim 22, wherein said predetermined binary state is one of a binary one and a binary zero.

26. The method of claim 22, further comprising the step of concatenating at least one bit from said preliminary number with said portion of said authentication value to form said authentication code.

27. A consumable used by an imaging device, wherein memory is associated with the consumable, the memory comprising:

an identification number associated with the consumable; and an authentication code matching a verifying code generated by a method comprising:

processing an input including at least said identification number, using a first algorithm to generate a preliminary number different from said identification number;

compressing said preliminary number using a compression algorithm that utilizes said identification number to generate said verifying code, said compressing step conveffing said preliminary number having a first number of bits to said authentication value having a second number of bits, said first number of bits being greater than said second number of bits;

determining a third number of bits in said identification number;

dividing said preliminary number into a plurality of groups of bits, a number of said plurality of groups of bits being equal to said third number of bits of said identification number, each of said groups having a number of bits equal to said quotient;

correlating each bit of said identification number to one group of said plurality of groups of bits of preliminary number;

selecting from said plurality of groups of bits of said preliminary number, each group having a corresponding identification number bit having a predetermined binary state; and selecting at least one bit from each selected group of bits based on a mod function to form at least a portion of said authentication value.

28. The method of claim 27, wherein said preliminary number is an output digest of a hashing function.

29. The method of claim 27, wherein said mod function is a mod4 function.

30. The method of claim 27, wherein said predetermined binary state is one of a binary one and a binary zero.

31. The method of claim 27, further comprising the step of concatenating at least one bit from said preliminary number with said portion of said authentication value to form said authentication code.

32. A data structure associated with a consumable used by an imaging device, the data structure comprises:

an identification number associated with the consumable; and an authentication code matching a verifying code generated by a method comprising:

processing an input including at least said identification number, using a first algorithm to generate a preliminary number different from said identification number;

compressing said preliminary number using a compression algorithm that utilizes said identification number to generate said verifying code, said compressing step conveffing said preliminary number having a first number of bits to said authentication value having a second number of bits, said first number of bits being greater than said second number of bits;

determining a third number of bits in said identification number;

dividing said preliminary number into a plurality of groups of bits, a number of said plurality of groups of bits being equal to said third number of bits of said identification number, each of said groups having a number of bits equal to said quotient;

correlating each bit of said identification number to one group of said plurality of groups of bits of preliminary number;

selecting from said plurality of groups of bits of said preliminary number, each group having a corresponding identification number bit having a predetermined binary state; and selecting at least one bit from each selected group of bits based on a mod function to form at least a portion of said authentication value.

33. The method of claim 32, wherein said preliminary number is an output digest of a hashing function.

34. The method of claim 32, wherein said mod function is a mod4 function.

35. The method of claim 32, wherein said predetermined binary state is one of a binary one and a binary zero.

36. The method of claim 32, further comprising the step of concatenating at least one bit from said preliminary number with said portion of said authentication value to form said authentication code.

* * * * *